July 1, 1947.  G. H. AUBEY  2,423,282
UNIVERSAL MOUNTING ATTACHMENT FOR CAMERAS
Filed Feb. 20, 1946   2 Sheets-Sheet 1
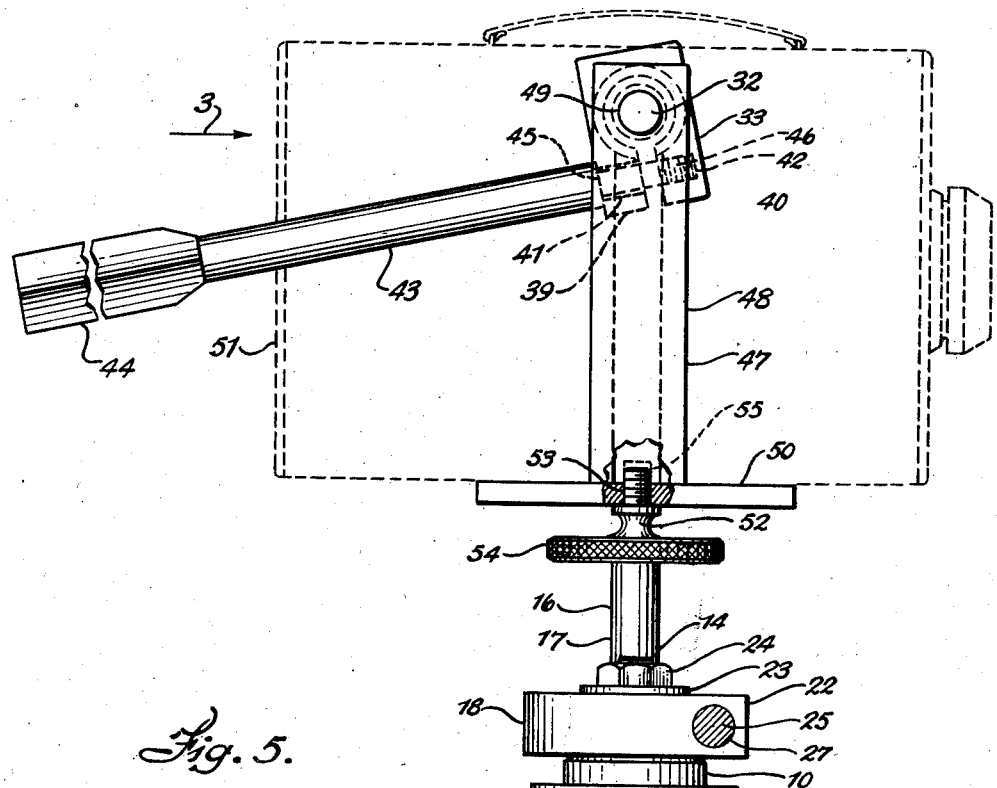
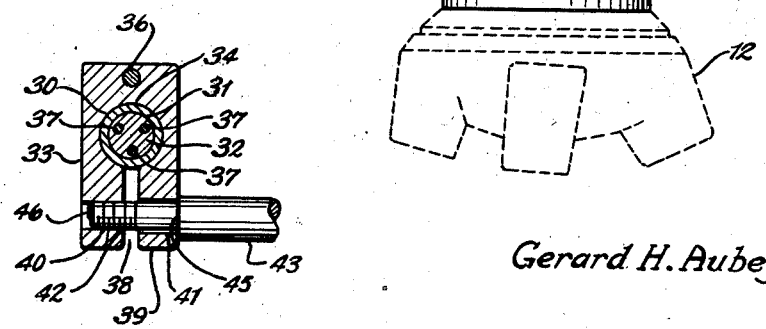
Inventor
Gerard H. Aubey.
By *Clarence A. O'Brien and Harvey B. Jacobson*
Attorneys

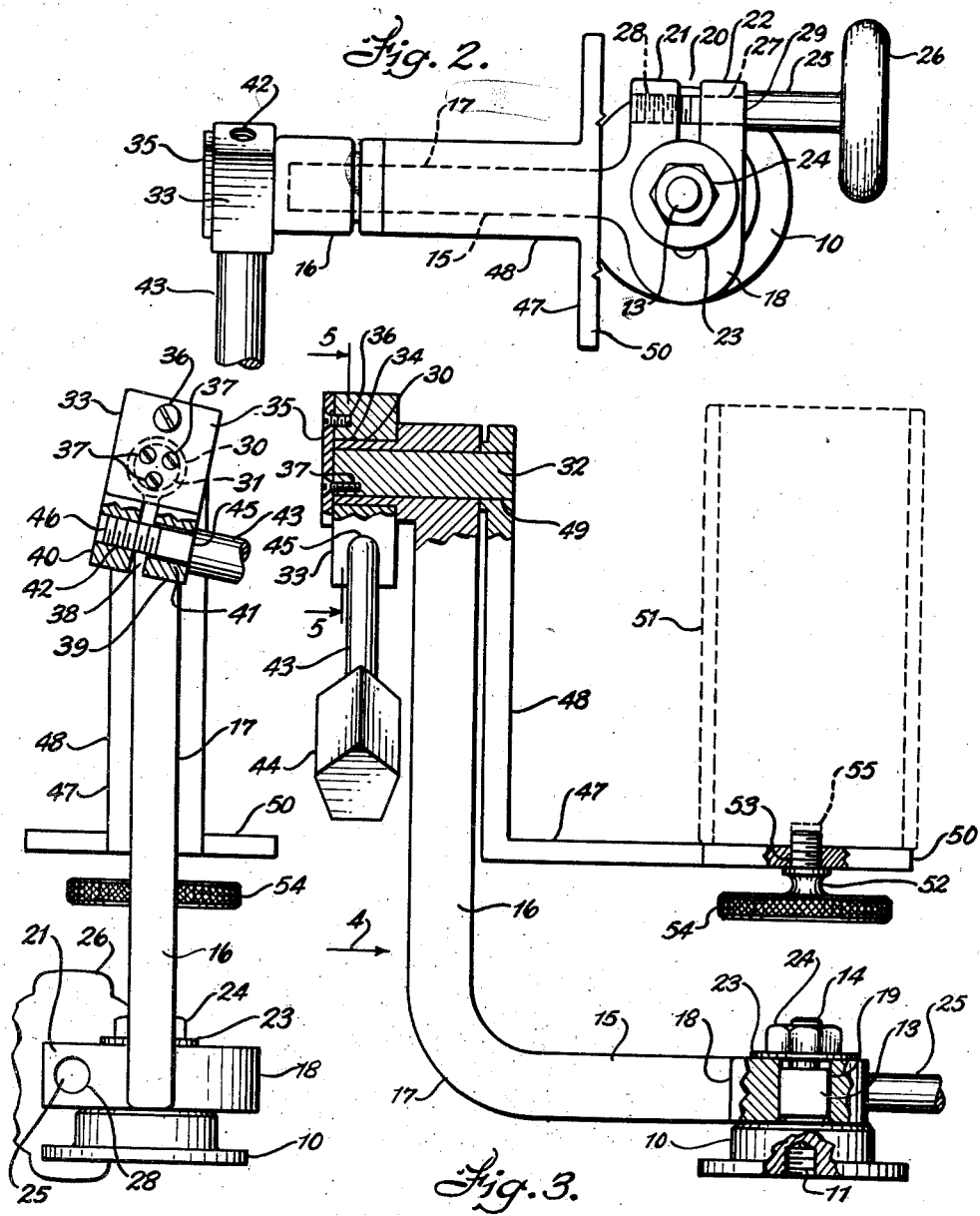

Patented July 1, 1947

2,423,282

UNITED STATES PATENT OFFICE 2,423,282

UNIVERSAL MOUNTING ATTACHMENT FOR CAMERAS

Gerard H. Aubey, Venice, Calif.

Application February 20, 1946, Serial No. 649,005

6 Claims. (Cl. 248—176)

This invention relates to new and useful improvements and structural refinements in universal mounting attachments for cameras and the like, and the principal object of the invention is to provide a device of the character herein described which is particularly adapted for the mounting of a moving picture camera in such manner that the same may be completely rotated about both the horizontal and the vertical axis thereof.

A further object of the invention is to provide a universal mounting attachment in which the camera may be firmly and securely locked in any desired position.

Another object of the invention is to provide a universal mounting attachment, the adjustment of which may be easily and quickly made.

An additional object of the invention is to provide a mounting attachment which is of simple construction and which cannot easily become damaged.

A still further object of the invention is to provide a mounting attachment which may be quickly and conveniently secured to supporting structures, such as a tripod and the like.

With the above more important objects in view, and such other objects as may become apparent as this specification proceeds, the invention consists essentially of the arrangement and construction of parts as illustrated in the accompanying drawings, in which—

Figure 1 is a side elevation of the invention, partially broken away to reveal its construction.

Figure 2 is a plan view of the same, also partially broken away.

Figure 3 is an end view thereof, taken in the direction of the arrow 3 in Figure 1.

Figure 4 is a fragmentary, side elevational, detail, taken in the direction of the arrow 4 in Figure 3.

Figure 5 is a cross-sectional view, taken in the plane of the line 5—5 in Figure 3.

Like characters of reference are used to designate like parts in the specification and throughout the several views.

Referring now to the accompanying drawings in detail, the invention consists of a circular base 10, provided in the underside thereof with a screw-threaded bore 11, whereby it may be conveniently attached to a supporting structure such as the tripod 12.

Projecting upwardly from the base 10 is a spigot 13, the same being provided with a screw-threaded portion 14, hereinafter more particularly described.

A horizontal arm 15 and a vertical arm 16 define an angle bracket designated by the general reference numeral 17. The free end of the arm 16 is widened to form a clamp 18, the latter being provided with a vertically extending bore 19 and with a slot 20 forming a pair of resilient ears 21 and 22.

The clamp 18 is rotatable on the spigot 13 and is retained in position thereon by means of a washer 23 and a nut 24, the latter engaging the aforementioned screw-threaded portion 14. A locking screw 25, provided with a hand knob 26, passes freely through an aperture 27 formed in the ear 22 and engages a threaded bore 28 in the ear 21.

It will be apparent from the construction already described that the bracket 17 is freely rotatable in a vertical plane about the spigot 13 and that by tightening the screw 25, the shoulder 29 of the latter will bear against the ear 22 and tighten the clamp 18 to prevent the rotation of the bracket 17.

The upper end of the vertical arm 16 is formed with an adaptor sleeve 30 and a horizontal bore 31 extends through the sleeve and through the arm as will be clearly apparent from the accompanying drawings.

A pin 32 is freely rotatable in the bore 31 and a clamping block 33, provided with the bore 34, is rotatable on the sleeve 30, as is best illustrated in the accompanying Figure 3.

It will be noted that the end of the pin 32 is flush with the outer surface of the block 33 and a connecting plate 35 is secured adjacent to the block by means of a suitable bolt 36. The plate 35 is also secured to the end of the pin 32 by means of a plurality of bolts 37 and it will be observed that by rotating the block 33, rotation of the pin 32 will be effected.

The block 33 is slotted as indicated by the reference numeral 38 to form a pair of ears 39 and 40 provided with the aperture 41 and the threaded bore 42 respectively. A handle 43, provided at one end thereof with a hand grip 44, is formed at its remaining end with a shoulder 45 and a screw-threaded portion 46. The latter passes freely through the aperture 41 and engages the threaded bore 42, the clamp thus formed being similar in effect to the aforementioned clamp 18.

It will be noted in this connection, that by tightening the hand grip 44, the shoulder 45 will bear against the ear 39 and tighten the clamping block 33 on the sleeve 30 to prevent rotation thereof and of the associated pin 32.

An off-set platform, designated by the general reference numeral 47, consists of a right angled support arm 48, provided at one end thereof with an aperture 49, whereby it may be firmly secured to the remaining end of the pin 32. The remaining end of the arm 48 is formed integrally with a substantially flat mounting plate 50, on which the camera 51 may be conveniently supported. The camera is retained in position by means of a mounting screw 52, positioned in a suitable aperture 53 provided in the plate 50. The screw 52 is provided with a knurled head 54 and the shank of said screw engages a threaded aperture 55, usually provided in the base of the camera 51.

It will be noted that the axes of the spigot 13 and the screw 52 are coincidental and that they intersect the axis of the pin 32 substantially at the center of gravity of the camera 51.

Having thus described the constructional details of the invention, its method of operation will now be presented.

When the invention is placed in used, the base 10 is secured to the pedestal or tripod 12 in the manner already described and the camera 51 is mounted upon the plate 50 by means of the screw 52.

By loosening the locking screw 25, the grip of the clamp 18 on the spigot 13 will be slackened and the bracket 17, together with the associated camera, may be rotated in a vertical plane about the spigot 13 through any number of complete revolutions.

Similarly, by loosening the handle 43, the grip of the clamping block 33 upon the sleeve 30 will be slackened and by manipulating the handle, the pin 32 and the associated camera may be rotated in a horizontal plane through any required number of revolutions.

The advantages of the universal mounting attachment constructed in accordance with the invention become clearly apparent, since the camera may be adjusted to and locked in virtually any desired position. It should be noted that the positional relationship of the platform 47 with respect to the pin 32 and the spigot 13 is such that the camera is rotated both in the horizontal and in the vertical plane about its center of gravity, thereby substantially minimizing the amount of force required for the balancing and adjusting thereof.

A further advantage of the invention resides in the possibility of the camera being used for filming while in the fully inverted position so that the exposures made thereby may be developed and subsequently uprighted. In this manner, the projected film will create the impression of reversed action, such as may be conveniently employed in trick photography.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A universal mounting attachment for cameras, comprising in combination, a base, an upwardly extending spigot on said base, a horizontal arm and a vertical arm defining an angle bracket, said spigot being connected adjacent to the free end of said horizontal arm, said bracket being rotatable in a vertical plane on said spigot, a transversely extending pin adjacent the upper end of said vertical arm, an off-set platform secured to said pin, said pin and said platform being rotatable in a horizontal plane, a handle connected to said pin, means for releasably locking said handle and said bracket to prevent rotation thereof, and further means for attaching said camera to said platform.

2. The device as defined in claim 1, in which the axes of said spigot and of said pin intersect substantially at the center of gravity of said camera.

3. The device as defined in claim 1, in which said means for locking said bracket comprises, in combination, a clamp formed at the free end of said horizontal arm, said clamp being slotted to form a pair of resilient ears, a vertically extending bore through said clamp, and a locking screw, said spigot being rotatable in said bore, and said screw extending through said ears to prevent the rotation of said clamp on said spigot.

4. The device as defined in claim 1, in which said means for locking said handle comprises in combination, a clamping block slotted to form a pair of resilient ears, a bore extending through said block, a screw-threaded portion at one end of said handle, a connecting plate, and an adaptor sleeve adjacent the upper end on one side of said vertical arm, said block being rotatable on said sleeve, said pin being rotatable in said sleeve, said plate being bolted adjacent to said block and to the end of said pin, and said screw-threaded portion of said handle engaging said ears to prevent the rotation of said block on said sleeve.

5. The device as defined in claim 1, in which said platform comprises in combination, a right-angled support arm secured at one end thereof to said pin, a substantially flat mounting plate at the remaining end of said arm, and releasable means for attaching said camera to said plate.

6. A universal mounting attachment for cameras, comprising in combination, a base adapted for attachment to a supporting structure, an upwardly extending spigot on said base, a horizontal arm and a vertical arm defining an angle bracket, a clamp at the free end of said horizontal arm, said clamp being rotatably positioned on said spigot, a lock nut on said spigot for retaining said clamp in position thereon, a locking screw on said clamp for preventing rotation thereof on said spigot, an adaptor sleeve adjacent the upper end of said vertical arm, a horizontally extending bore through said sleeve and through said arm, a pin, a clamping block, a connecting plate, said pin being rotatable in said bore, said block being rotatable on said sleeve, said plate being bolted to said block and to one end of said pin, a handle, a screw-threaded portion at one end and a hand grip at the remaining end of said handle, said screw-threaded portion engaging said clamping block to prevent rotation thereof on said sleeve, a right-angled support arm and a mounting plate on one end of said arm defining an off-set platform, the remaining end of said arm being secured to the remaining end of said pin, and a knurled mounting screw in said mounting plate, said screw being adapted to engage said camera.

GERARD H. AUBEY.

REFERENCES CITED

The following references are of record in the file of this patent:

UNITED STATES PATENTS

| Number | Name | Date |
|---|---|---|
| 2,226,827 | Moore | Dec. 31, 1940 |
| 2,237,281 | Diesbach | Apr. 1, 1941 |